United States Patent [19]
Mukai et al.

[11] 3,923,015
[45] Dec. 2, 1975

[54] COMBUSTION CHAMBER OF SPARK IGNITION INTERNAL COMBUSTION ENGINE

[75] Inventors: Kosaburo Mukai, Tokyo; Yasufumi Oguri; Yasuo Tatano, both of Yokosuka; Yoshikazu Kasahara, Yokohama, all of Japan

[73] Assignee: Nissan Motor Company Limited, Yokohama, Japan

[22] Filed: May 3, 1974

[21] Appl. No.: 466,905

[30] Foreign Application Priority Data
May 4, 1973 Japan.............................. 48-50057

[52] U.S. Cl......... 123/32 B; 123/32 SP; 123/191 S; 123/193 H; 123/193 CH
[51] Int. Cl.² ......................................... F02B 19/16
[58] Field of Search ............ 123/32 C, 32 K, 32 ST, 123/32 SP, 30 D, 30 C, 75 B, 191 S, 191 ST, 193 C, 193 CH, 193 H, 193 CP, 32 B

[56] References Cited
UNITED STATES PATENTS

| | | | |
|---|---|---|---|
| 2,720,870 | 10/1955 | Grob | 123/32 B |
| 2,982,270 | 5/1961 | Seegelken | 123/32 B |
| 3,092,087 | 6/1963 | Holt et al. | 123/30 D |
| 3,150,654 | 9/1964 | Robison | 123/32 SP |
| 3,196,857 | 7/1965 | Zimmermann | 123/32 C |
| 3,357,318 | 12/1967 | Packard et al. | 123/193 P X |
| 3,504,681 | 4/1970 | Winkler | 123/32 ST |
| 3,797,466 | 3/1974 | Nambu | 123/32 ST |

FOREIGN PATENTS OR APPLICATIONS

| | | | |
|---|---|---|---|
| 1,194,655 | 6/1970 | United Kingdom | 123/32 SP |
| 433,342 | 8/1935 | United Kingdom | 123/30 C |

*Primary Examiner*—Charles J. Myhre
*Assistant Examiner*—William C. Anderson

[57] ABSTRACT

A pair of dome-shaped recesses differing in volume from each other are formed in a flat piston top or in a flat cylinder head surface opposite thereto, and the surface is concaved at a region around the opening of the larger recess, so that a squish area is established only around the smaller recess, causing a strong turbulent flow of a combustible mixture within the smaller recess but with little influence on the mixture in the larger recess. Consequently, a very lean mixture can be reliably ignited in the smaller recess, and a resulting main combustion in the larger recess proceeds rather slowly and at moderate temperatures to give a clean exhaust.

20 Claims, 12 Drawing Figures

COMBUSTION CHAMBER OF SPARK IGNITION INTERNAL COMBUSTION ENGINE

This invention generally relates to spark ignition internal combustion engines of reciprocating type, and more particularly to an arrangement of a combustion chamber in an engine cylinder assembly for smoothly burning a lean air-fuel mixture with minimized pollutants production.

Most of conventional spark ignition internal combustion engines, especially automobile engines, are designed to work on a premix combustion, wherein an air-fuel mixture prepared in a carburetor is fed to engine cylinders or combustion chambers to be compressed and burned. The mixture is usually prepared to have an air/fuel ratio near the stoichiometric ratio to obtain satisfactory engine power with a moderate fuel consumption. As is known, combustion of such a mixture produces high temperatures and accordingly produces a large amount of oxides of nitrogen (NOx), which is one of major pollutants in exhaust gas.

In recent years, a marked tendency to use a mixture of a high air/fuel ratio, or a lean mixture is seen in the art to minimize emission of two other pollutants, namely, unburned hydrocarbons (HC) and carbon monoxide (CO). However, employment of a considerably lean air-fuel mixture presents various problems including difficulty in ignition and increase in formation of NOx.

As a solution to these problems, a combustion chamber of a unique configuration is known, which will be briefly explained before explanation of the invention with reference to the accompanying drawings in which.

Figure 1:
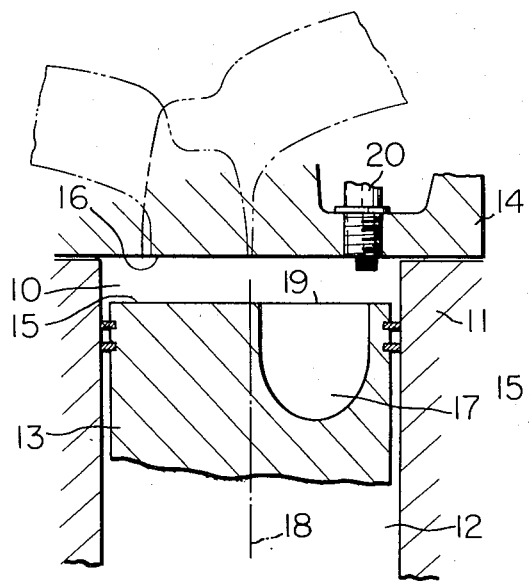
FIG. 1 is a schematic longitudinal section of a prior art engine cylinder assembly.
Figure 2:
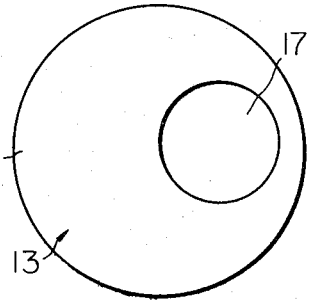
FIG. 2 is a top plan view of a piston shown in FIG. 1.

Referring to FIG. 1, a cylindrical combustion chamber 10 is defined by a cylinder bore 12 in a cylinder block 11, a piston 13 reciprocatingly slidable in the cylinder bore 12 and a cylinder head 14 fixed to the cylinder block 11 to seal the upper end of the bore 12. In the afore-mentioned configuration, a piston top surface 15 and a base surface 16 of the cylinder head 14 are formed flat. The piston 13 is bored axially from the top-surface 15 to form a considerably large recess 17, which is shaped dome-like and is off center with respect to the piston axis 18. The area of the opening 19 of the recess 17 is less than half of the original piston top surface area. A spark plug 20 in the cylinder head 14 is located to face the recess 17 at the end of a compression stroke of the piston 13. When the piston 13 nears the top dead center in such an arrangement, a combustible mixture in the chamber 10 is extremely compressed between the cylinder head surface 16 and the closely approaching piston top surface 15, and is violently squeezed into the recess 17. As a result of this phenomenon, which is commonly called "squish", a severe turbulence, or vortical flow of the mixture occurs within the recess 17. The turbulence causes a thorough blending of the mixture. As a result, reliable ignition of the mixture and progress of a stable combustion can be accomplished even when a considerably high air/fuel ratio is used. The strong turbulence of the combustion mixture, however, causes an increased burning rate and accordingly an elevated combustion temperature, which are undesirable from the viewpoint of suppressing the formation of NOx.

It is therefore an object of the present invention, with respect to a spark ignition internal combustion engine, to provide an engine cylinder assembly forming a combustion chamber which permits a considerably lean air-fuel mixture to be smoothly burned at moderate temperatures so that production of pollutants can be minimized.

According to the invention, an engine cylinder assembly of a spark ignited reciprocating engine comprises a cylinder, a piston having a flat top surface, a cylinder head having a flat inner surface defining a cylindrical and variable volume chamber between the piston top surface, a first larger and second smaller dome-shaped recesses serving as a main combustion chamber and an ignition chamber, respectively, a spark plug exposed to the second recess when the piston nears the top dead center, and a tapered or curved concavity shallower than the first recess and arranged substantially around the opening of the first recess. The piston is arranged in such a manner that the cylindrical chamber is reduced in volume or thinned enough to establish a squish causing area when it nears the top dead center, but the concavity disturbs the establishment of such an area around the opening of the first recess. Each of the openings of the two recesses is exposed to the cylindrical chamber and occupies an area less than 50% of the piston top surface area. The two recesses are separate from each other and are located off center with respect to the longitudinal axis of the cylinder. Both recesses may be formed either in the piston or in the cylinder head and either together or respectively, and the concavity may be formed either on the same surface with the first recess opening or on the surface opposing the opening.

Other features and advantages of the invention will become apparent from the following detailed description of preferred embodiments thereof with reference to the accompanying drawings.

Figure 3:
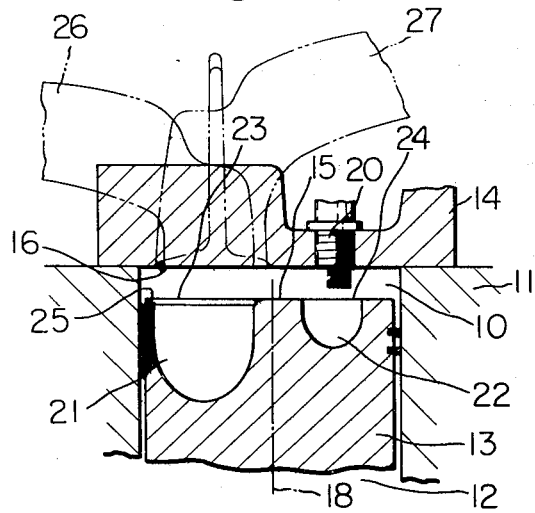
FIG. 3 is a schematic longitudinal section of an engine cylinder assembly showing an embodiment of the invention.
Figure 4:
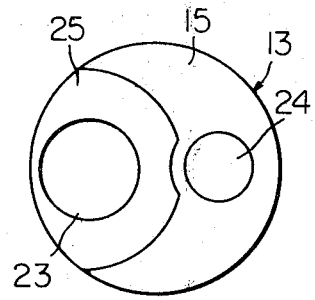
FIG. 4 is a top plan view of a piston shown in FIG. 3.

Referring now to FIGS. 3 and 4, a cylinder block 11, a piston 13 within a cylinder bore 12 and a cylinder head 14 are assembled similarly to the above described assembly of FIG. 1. The piston 13 is connected to a crankshaft (not shown) by means of a connecting rod (not shown) in a usual manner, and the cylinder head 14 is fixed to the cylinder block 11 as usual, for example, interposing a gasket (not shown). Both the piston top surface 15 and the base surface 16 of the cylinder head 14 are made flat and are arranged in parallel. The piston 13 is arranged to come very close to the opposing surface 16 at the top dead center. In a first embodiment of the invention, the flat piston top surface 15 is bored at two regions to give a first large recess 21 and a second smaller recess 22. The first recess 21 is considerably larger than the second recess 22 in volume and usually also in diameter. Both recesses 21 and 22 are located off center with respect to the piston axis 18, the longitudinal axes thereof being generally parallel to the piston axis 18. The recesses 21 and 22 have "dome-like" shape which is herein defined as a shape having a generally curved top, including hemispherical, conjoined to a circular or oval base either directly or via a cylindrical or eliptical peripheral wall. Each the areas of the bases or openings 23 and 24 of the recesses 21 and 22 occupy less than half of the original piston-top surface 15 area. The volume ratio of the larger recess 21 to the smaller recess 22 ranges preferably from about 4/1 to about 100/1. A generally annular shallow concavity 25 is formed on the piston top 15 in conjunction with the periphery of the opening 23 of the larger recess 21. The wall of the concavity 25 is either tapered or curved to have a maximum depth at the periphery of the opening 23. The shallow concavity 25 may be regarded as an enlarged chamfer or counter-boring of the opening 23. It is important that the opening 24 of the smaller recess 22 has a sharp-edged periphery. Although width of the concavity 25 is not strictly restricted, an excessively large width is unsuitable because the flat region of the surface 15 is required in the invention to establish a squish area around the opening 24. The preferred width of the concavity 25 usually lies in a range between about 1/50 to about 1/5 of the diameter of the larger recess 21. A spark plug 20 is screwed into the cylinder head 14 at a location facing the smaller recess 22. An intake port 26 and an exhaust port 27 equipped with an intake valve and an exhaust valve (no numerals), respectively, are provided through the cylinder head 14 in a usual manner.

In operation, a considerably lean air-fuel mixture is taken into the chamber 10 by an intake stroke of the piston 13 and then is progressively compressed during a compression stroke. When the piston 13 nears the top dead center point, the clearance between the piston-top 15 and the cylinder head surface 16 becomes so small that a squish area is established above the flat region of the piston-top surface 15. As explained before, the occurrence of a squish gives rise to a vortex or turbulence of the mixture within the smaller recess 22. The mixture is thus thoroughly blended, so that the fuel is intimately mixed with air. A spark from the spark plug 20 to the mixture in such a state achieves a reliable ignition despite a large air/fuel ratio of the mixture.

On the other hand, the shallow concavity 25 increases the gap between the piston top 15 and the cylinder head surface 16, thus the squish causing area decreases locally around the opening 23 of the larger recess 21. Accordingly, the mixture in the larger recess 21 is subject to less the squish influence; in other words, there occurs only a weak turbulence. As a result, combustion in the larger recess 21, which serves as a main combustion chamber, initiated by flame propagation form the smaller recess 22 proceeds rather slowly and at moderate temperatures. As explained before, a slow burning and a low combustion temperature contribute to reduction of HC and CO, and NOx, respectively.

Figure 5:
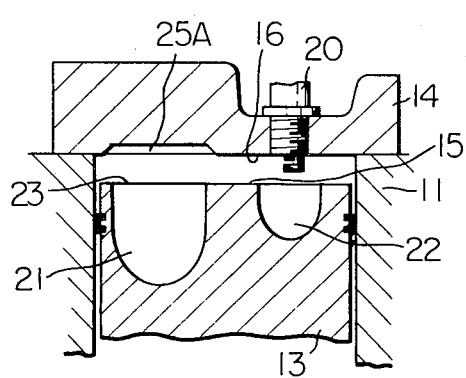
FIGS. 5, 7, 9, 10 and 12 are sectional views similar to FIG. 3, showing variations in embodiments of the invention.
Figure 6:
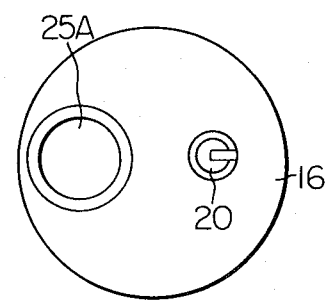
FIGS. 6 and 11 are bottom plan views of cylinder heads shown in FIGS. 5 and 10, respectively.

Considering the above described function of the shallow concavity 25, it will be understood that the concavity 25 is not necessarily formed on the piston top 15, but may be formed on the opposing cylinder head surface 16 at a region facing the opening 23. FIGS. 5 and 6 show an example of such arrangement. A concavity 25A formed on the surface 16 opposite to the opening 23 may be shaped either generally circular as shown in FIG. 6 or generally annular similar to the concavity 25 of FIG. 4.

Figure 7:
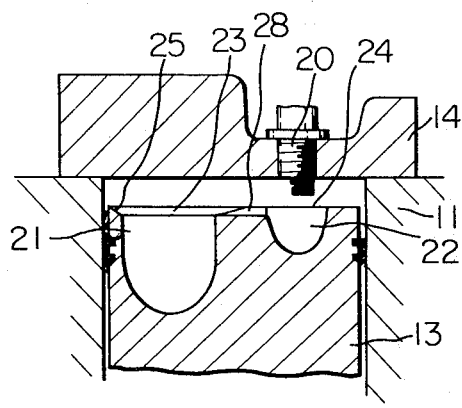
Figure 8:
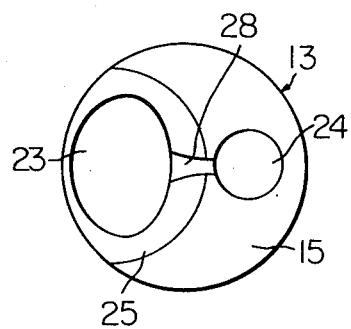
FIG. 8 is a top plan view of a piston shown in FIG. 7.

In a modified embodiment shown in FIGS. 7 and 8, the opening 23 of the larger recess 21 has a generally oval shape. It will be apparent that there is little restriction on the cross-sectional shape of the two recesses 21 and 22, in particular the larger one 21, according to the invention.

The piston top 15 of FIG. 8 is further provided with a generally linear groove 28 connecting the smaller recess 22 with the larger recess 21 to facilitate the propagation of flame. The groove 28 may be varied in shape, width and/or depth depending on the design of the two recesses 21 and 22. But the width at the periphery of the opening 24 must be small enough so as not to exceedingly reduce the squish effect.

Figure 9:
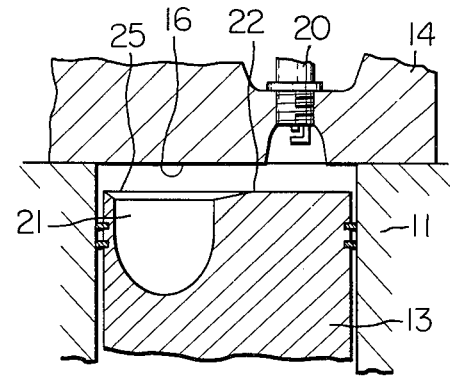
Figure 10:
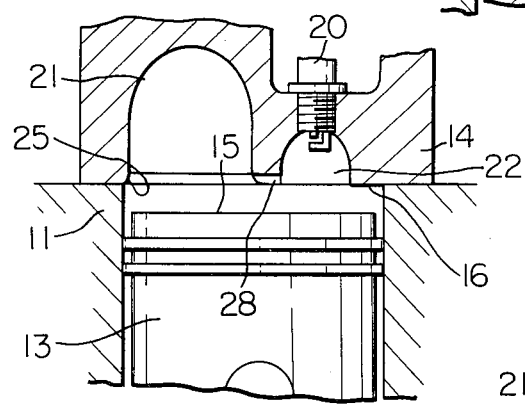
Figure 11:
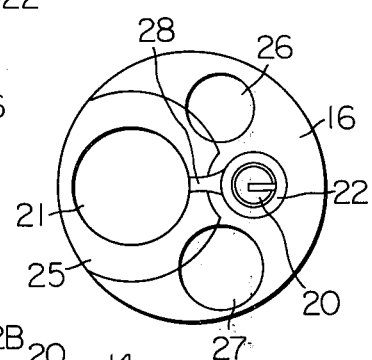
Figure 12:
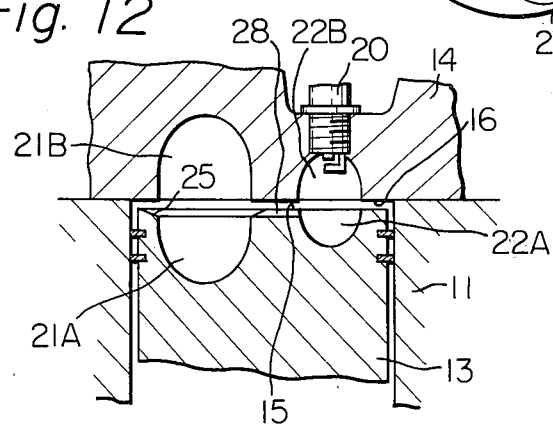

In another preferred embodiment shown in FIG. 9, the smaller recess 22 is formed in the cylinder head 14 while the larger recess 21 and the surrounding shallow concavity 25 are formed in the piston 13. The size and relative location of the two recesses 21 and 22 are determined similarly to the embodiment of FIG. 3, and the two surfaces 15 and 16 are left flat except for provision of the concavity 25. In operation, the behavior and combustion of the mixture are identical with the preceding description. Further, both of the two recesses 21 and 22 may be formed in the cylinder head 14 as shown in FIGS. 10 and 11. The shallow concavity 25 and the groove 28, if necessary, are arranged in accordance with the design criteria as set up when the recesses 21 and 22 are formed in the piston 13. The shallow concavity 25 in this arrangement may alternatively be formed on the piston-top 15. Besides such variety of arrangement, the number of the dome-like recesses 21 and 22 is not limited to one pair. Two pairs of the recesses 21 and 22 may be provided as shown in FIG. 12, a pair in the piston 13 and another in the cylinder head 14, when a relatively large combustion chamber volume is required and/or when configurations of the piston 13 and the cylinder head 14 are unsuitable for provision of a voluminous recess. In this arrangement, the larger recess 21B and the smaller recess 22B in the cylinder head 14 are usually located to be opposite to or coaxial with the recesses 21A and 22A in the piston 13, respectively, and their openings 23B and 24B are identical with the opposing openings 23A and 24A, respectively. Provision of a generally annular concavity 25 and a groove 28 on either of the opposing surfaces 15 or 16 suffices for the respective functions although the provision on the both surfaces 15 and 16 does no harm.

To summarize, the essential feature of a combustion chamber according to the invention consists of (a) the two separate recesses, the smaller one 22 and the larger one 21, which serve as an ignition chamber and a main combustion chamber, respectively, (b) the flat surfaces 15 and 16 of the piston 13 and the cylinder head 14 opposite to each other, and (c) the shallow concavity 25 formed substantially around the opening 23 of the larger recess 21. Minor factors such as the cross-sectional shape of the recesses 21 and 22, locations for provision thereof and of the concavity 25, and formation of the flame-conducting groove 28 may be determined with wide variations.

A combustion chamber of such configuration solves the problem involved in the prior art using a lean air-fuel mixture. The combination of the flat surfaces 15 and 16 and the ignition chamber 22 having a sharp-edged opening 24 allows a very lean mixture to be reliably ignited due to the squish and resulting vortex of the mixture. In the main combustion chamber 21 provided with the concavity 25, the combustion rate and hence the combustion temperature can be maintained within moderate ranges as a result of the avoidance of the squish phenomenon around the larger recess 21. Consequently, a combustion chamber of the invention discharges a remarkably clean exhaust gas. In addition to a natural decrease in CO concentration resulting from the operation on a lean mixture, production of NOx is greatly suppressed by a reduced combustion temperature, and HC is also reduced due to a slow burning.

What is claimed is:

1. In an engine cylinder assembly for a spark ignition internal combustion engine having (a) a cylinder, (b) a piston reciprocatingly slidable in said cylinder and having a flat top surface, (c) a cylinder head sealing an end of said cylinder to define a cylindrical variable volume chamber between a flat surface thereof and said flat piston top surface, (d) a first domeshaped recess to serve as a main combustion chamber having an opening area smaller than 50% of the area of said piston top surface, the location thereof being off center with respect to the longitudinal axis of said cylinder, and (e) a spark plug, said cylindrical chamber being reduced in volume so as to establish a squish causing area when said piston nears the top dead center (f) a second dome-shaped recess smaller in volume than said first recess to serve as an ignition chamber, the location thereof being separate from said first recess, off center with respect to said axis and faced to the spark gap of said spark plug when said piston nears the top dead center, (g) means to supply a combustible airfuel mixture to the cylinder chamber, the improvement comprising the provision of (h) means defining a concavity shallower than said first recess and arranged substantially around the opening of said first recess, the cross-section thereof being varied to be largest at the opening thereof exposed to said cylindrical chamber and smallest at the bottom thereof so that the influence of squish on said first recess is lessened, and (i) said second domeshaped recess having a sharp-edged mouth periphery.

2. The improvement as claimed in claim 1, wherein the volume ratio of said second recess to said first recess is between about one one-hundredth and about one-fourth.

3. The improvement as claimed in claim 1, wherein said assembly is provided with said concavity at a region adjacent to and surrounding the opening of said first recess on a flat surface.

4. The improvement as claimed in claim 1, wherein said assembly is provided with said concavity at a region on a flat surface opposite to the opening of said first recess.

5. An engine cylinder assembly of a spark ignition internal combustion reciprocating engine comprising (a) a cylinder, (b) a piston in said cylinder having a flat top surface, (c) a cylinder head sealing an end of said cylinder to define a cylindrical variable volume chamber between a flat surface thereof and said flat piston top surface, (d) a first dome-shaped recess to serve as a main combustion chamber, (e) a second dome-shaped recess to serve as an ignition chamber, smaller in volume than said first recess and separate from said first recess, (f) a spark plug installed on said cylinder head, the spark gap thereof being exposed to said second recess when said piston nears the top dead center, (g) means to supply a combustible air-fuel mixture to the cylinder chamber, and (h) means defining a concavity shallower than said first recess and arranged substantially around the opening of said first recess; said cylindrical chamber being reduced in volume enough to establish a squish causing area when said piston nears the top dead center, locations of said two recesses being off center with respect to the longitudinal axis of said cylinder, each of the openings of said two recesses being exposed to said cylindrical chamber and occupying an area less than 50% of the area of said piston top surface, the bottoms thereof being curved, and the cross-section of said concavity being varied to be largest at the opening thereof exposed to said cylindrical chamber and smallest at the bottom thereof so that the establishment of said squish causing area is disturbed at a region facing said concavity.

6. An engine cylinder assembly as claimed in claim 5, wherein the volume ratio of said second recess to said first recess is about one one-hundredth to about one-fourth.

7. An engine cylinder assembly as claimed in claim 5, wherein said cylinder head is provided with said first recess and said second recess.

8. An engine cylinder assembly as claimed in claim 5, wherein said piston is provided with said first recess and said second recess.

9. An engine cylinder assembly as claimed in claim 8, wherein said piston top surface is provided with said concavity at a region adjacent to and surrounding said opening of said first recess.

10. An engine cylinder assembly as claimed in claim 8, wherein said flat surface of said cylinder head is provided with said concavity at a region opposite to and substantially around said opening of said first recess.

11. An engine cylinder assembly as claimed in claim 8, wherein said piston top surface is further provided with a groove connecting said first and second recesses to facilitate flame front propagation from said second recess to said first recess.

12. An engine cylinder assembly as claimed in claim 11, wherein said flat surface of said cylinder head is provided with said concavity at a region adjacent to and surrounding said opening of said first recess.

13. An engine cylinder assembly as claimed in claim 11, wherein said piston top surface is provided with said concavity at a region opposite to and substantially around said opening of said first recess.

14. An engine cylinder assembly as claimed in claim 11, wherein said flat surface of said cylinder head is further provided with a groove connecting said first and second recesses to facilitate flame front propagation from said second recess to said first recess.

15. An engine cylinder assembly as claimed in claim 11, wherein said piston is provided with a third dome-shaped recess and a fourth recess smaller in volume than said third recess, the openings thereof being located opposite to said openings of said first recess and said second recess, respectively, and the total volume of said second and fourth recesses is between about one one-hundredth to about one-fourth of the total volume of said first and third recesses.

16. An engine cylinder assembly as claimed in claim 15, wherein said piston top surface is further provided with a groove connecting said third and fourth recess.

17. An engine cylinder assembly as claimed in claim 5, wherein said cylinder head is provided with said second recess and said piston is provided with said first recess.

18. An engine cylinder assembly as claimed in claim 5, wherein said openings of said first and second recesses are generally circular.

19. An engine cylinder assembly as claimed in claim 18, wherein the width of said concavity is about one-fiftieth to one-fifth of the diameter of said first recess.

20. An engine cylinder assembly as claimed in claim 5, wherein said opening of said first recess is generally oval.

* * * * *